No. 690,892.　　　　　　　　　　　　　　　Patented Jan. 7, 1902.
S. McINTYRE.
DEVICE FOR HITCHING OR UNHITCHING HORSES.
(Application filed Mar. 30, 1901.)
(No Model.)　　　　　　　　　　　　　　　2 Sheets—Sheet 1.
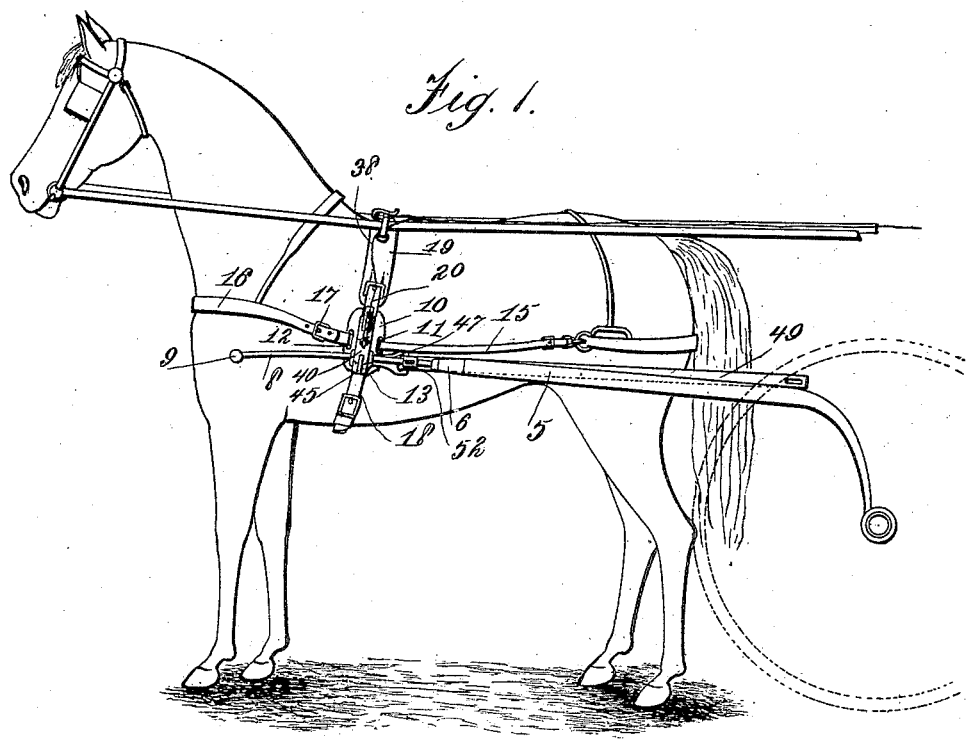
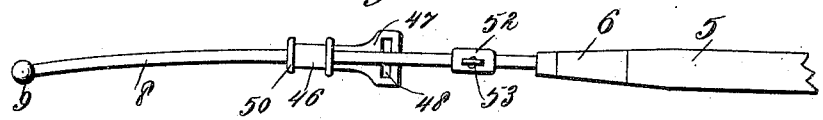
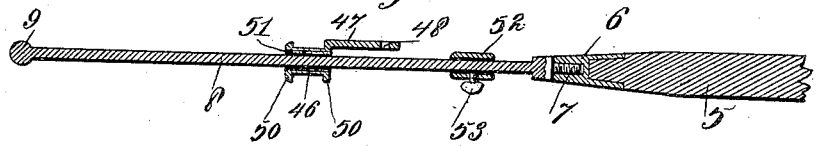
Witnesses:　　　　　　　　　　Samuel McIntyre, Inventor
　　　　　　　　　　　　　　　By Marion & Marion
　　　　　　　　　　　　　　　　　　　　Attorneys No. 690,892. Patented Jan. 7, 1902.
S. McINTYRE.
DEVICE FOR HITCHING OR UNHITCHING HORSES.
(Application filed Mar. 30, 1901.)
(No Model.) 2 Sheets—Sheet 2.
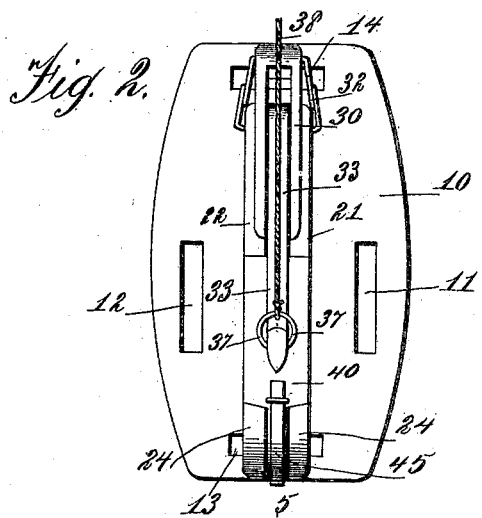
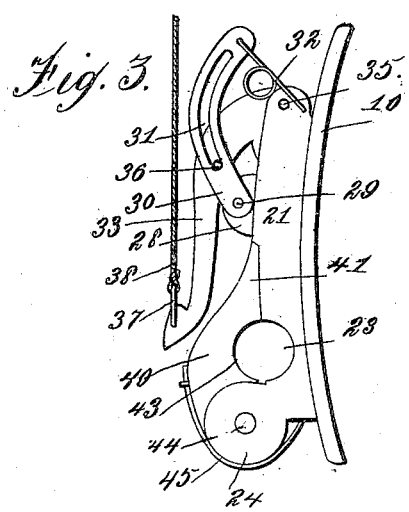
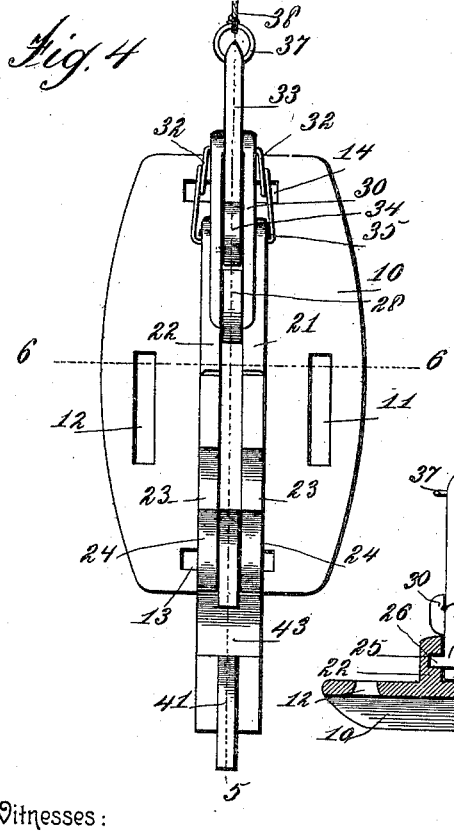
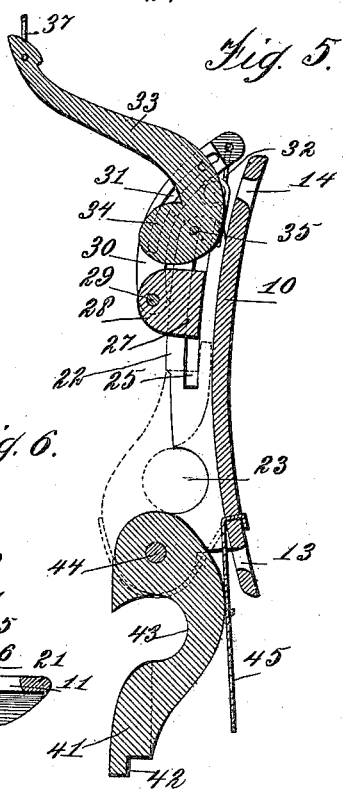
Witnesses:
J. A. Groat.
H. H. Benehap
Samuel McIntyre, Inventor
By Marion & Marion
Attorneys

UNITED STATES PATENT OFFICE.

SAMUEL McINTYRE, OF CANTERBURY STATION, CANADA, ASSIGNOR OF ONE-FOURTH TO ARCHIE DOUGLASS ANNETT, OF SACO, MAINE.

DEVICE FOR HITCHING OR UNHITCHING HORSES.

SPECIFICATION forming part of Letters Patent No. 690,892, dated January 7, 1902.

Application filed March 30, 1901. Serial No. 53,572. (No model.)

*To all whom it may concern:*

Be it known that I, SAMUEL MCINTYRE, of Canterbury Station, in the county of York, Province of New Brunswick, Canada, have invented certain new and useful Improvements in Devices for Hitching or Unhitching Horses; and I do hereby declare that the following is a full, clear, and exact description of the invention, such as will enable others skilled in the art to which it appertains to make and use the same.

My invention relates to improvements in devices for hitching and unhitching horses to and from vehicles; and the object in view is the provision of a secure and efficient mechanism adapted to connect the several coöperating parts of the hitching mechanism firmly together and at the same time enable them to be easily and quickly released by a simple pull on a safety-line, whereby the horse may instantly be released from the vehicle should it endeavor to run away.

A further object of the invention is to provide a latch mechanism which will effectually hold the retaining-keeper in its locked position and also operate quickly to release said retaining-keeper in an emergency, to allow a limited movement of the shaft or thill with respect to the retaining-keeper and without involving rattling of the parts, and to provide an adjustable holdback which may be changed to suit different sizes of horses.

With these ends in view the invention consists in the novel combination, construction, and arrangement of parts, which will be hereinafter fully described and claimed.

In the accompanying drawings, forming a part of this specification, Figure 1 is a side elevation of a harness embodying my invention. Fig. 2 is an enlarged view, in side elevation, of the retaining-keeper and the fastening device therefor, showing the parts in their closed locked positions. Fig. 3 is a view in elevation at right angles to Fig. 2. Fig. 4 is a side view, similar to Fig. 2, showing the parts in their open positions. Fig. 5 is a longitudinal section on the line 5 5 of Fig. 4. Fig. 6 is a detail cross-section on the line 6 6 of Fig. 4 looking in the direction of the arrow. Fig. 7 is a side elevation of a part of a thill, the trace-thimble, and the holdback-stop. Fig. 8 is a longitudinal section of the parts shown by Fig. 7.

The same numerals of reference denote like and corresponding parts in each figure of the drawings.

The thill or shaft 5 of a vehicle with which my improved harness is to be used is somewhat shorter than the ordinary thill in order that it may be equipped with a metallic ferrule 6, into which is screwed the threaded tenon 7 of a metallic rod 8, the latter being furnished with a bulb or head. This metallic rod may be curved in the direction of its length, as shown by Figs. 1 and 7, and said rod constitutes an extension of the thill 5.

Each side of the harness is equipped with a carrier-plate 10, the same being cast in a single piece of metal with a series of slots 11, 12, 13, and 14, which are adapted to receive the ordinary straps of a harness, as follows: The holdback-strap 15, which leads from the breeching, is connected to the carrier-plate by fitting the same in the slot 11, the carrier-plate is connected with the breast-strap 16 through the medium of the buckle 17 and by fitting said strap in the slot 12, the belly-band 18 is attached to the horizontal slot 13 at the lower edge of said carrier-plate, and the top part of the carrier-plate is connected to the harness-saddle 19 by means of a short strap 20, which is fitted in the upper horizontal slot 14.

The carrier-plate is provided with a pair of longitudinal flanges 21 22, which are made, preferably, as an integral part thereof and are disposed between the group of slots heretofore described. These flanges have the curved notched portions 23 formed near the lower ends thereof, and said lower ends of the flanges terminate into outwardly-extending lugs 24. Furthermore, the flanges are provided in their opposing edges with the longitudinal grooves 25, the latter arranged above the notched portions 23 and adapted to receive the flanges 26 on the slidable latch 27, as shown by Figs. 4, 5, and 6. This latch is confined for slidable movement in a vertical direction by said grooves in the parallel flanges 21 22, and said latch has an outwardly-extending lug 28, to which is pivoted, as at 29, the forked lower end of a segment 30.

This segment has a longitudinal slot 31, and to the upper end of said segment are attached the springs 32, said springs being secured to the flanges 21 22 or to the carrier-plate, as shown by Figs. 3 and 4, whereby the springs have a tendency to force the upper end of the slotted segment normally inward toward the carrier-plate, thus holding the segment and the slidable latch in their adjusted positions.

33 designates a cam-lever having a cam-shaped head 34, which is arranged between the upper ends of the flanges 21 22 and is pivotally connected thereto, as at 35. Said lever is provided with the laterally-extending studs or pins 36, which are loosely fitted in the longitudinal slots 31 of the pivoted segment, whereby said pins are adapted to lock the segment and the latch in their closed positions when said cam-lever 33 is turned downwardly to the position shown by Figs. 2 and 3. A ring or loop 37 is connected to the free end of said cam-lever for the purpose of attaching a safety-line 38 to the lever, said line adapted to be carried upward through the terret-ring on the harness-saddle, as shown by Fig. 1. It will be understood that the two cam-levers on opposite sides of the harness are provided with the safety-lines, which run through the terret-rings and are joined together, as represented by Fig. 1, so as to form a continuous cord or line which runs backwardly to the vehicle and is always kept within easy reach of the driver.

The retaining-keeper 40 is provided with a curved inner face and a nose 41, having a shoulder 42, the latter adapted to fit between the parallel flanges 21 22 and within or below the path of the slidable latch 27. This retaining-keeper is furthermore provided with a recess 43, and said keeper is pivoted on the pin 44, between the lugs 24, at the lower ends of the parallel flanges. Said keeper is adapted to be turned downwardly on its pivot 44 in order to assume the position indicated by Figs. 4 and 5 and to release the trace-thimble from the locking device; but in the operative position of this keeper it is raised, as shown by Figs. 2 and 3, in order to bring its recess 43 opposite to the recess 23 and to make its shouldered nose 42 fit within the retaining-flanges and within the path of the slidable latch 27. After the keeper shall have been adjusted to its closed position the cam-lever 33 is lowered, so that its studs 36 move the segment 30 and the latch 27 to their downward and operative positions, thus making the latch engage with the shouldered nose of the keeper and moving the slotted segment to the position shown by Fig. 3, wherein the segment and the latch are held against movement in their locked positions by the studs 36 and the cam-lever. The cam-lever is raised by a pull on the safety-line 38, and the segment 30 and the latch are correspondingly moved, so as to free the keeper 40. I have provided a spring 45, which is operatively connected to the carrier-plate and to the pivoted keeper 40 for the purpose of quickly throwing said keeper to its open and lowered position when the latch 27 is disengaged therefrom.

46 designates the trace-thimble, which is slidably fitted on the metallic rod 8 of the thill, and this thimble has a trace-plate 47, made as an integral part thereof, said plate being provided with a slot 48, to which is connected the ordinary trace or tug 49, the latter being connected at its rear portion to the whiffletree. The trace-thimble is provided at its opposite ends with the collars 50, and said thimble is cylindrical in form, so that it will be received in the circular opening provided by the registering recesses 23 43 in the carrier-plate and the keeper 40, respectively. This thimble, having the trace permanently attached thereto, is designed to fit removably in the keeper, and said trace-thimble is held against movement or displacement by its collars 50, arranged to impinge the opposite sides of the recessed portions 23 of the flanges 21 22 and the similarly-recessed portion of the keeper 40, whereby the trace-thimble is prevented from endwise movement on the carrier-plate; but it is adapted to be easily and quickly released therefrom in an emergency by allowing the keeper to drop to its lowered position, thus releasing the animal and minimizing the liability of injury to the occupants of the vehicle. The thill-rod 8 is adapted to slide or move freely in said trace-thimble, and to reduce the rattle I provide the trace-thimble with a noise-deadening lining 51, which may consist of leather or any other suitable material.

52 designates a holdback collar or sleeve, which is fitted on the thill-rod 8 at a suitable point between the thill and the trace-thimble, and this collar or sleeve is provided with a set-screw 53, by which the collar may be held securely in its adjusted position. The collar is disposed in the path of the trace-thimble, which is adapted to abut against the collar when the harness is pulled back, so that the carrier-plate and the trace-thimble will move rearwardly into engagement with said collar 52, the thill-rod 8 moving in a forward direction, so that the clamped collar will serve as the holdback. It is evident that the collar 52 may be adjusted on the thill-rod according to the size of the harness.

It is thought that the operation and advantages of my invention will be readily understood from the foregoing description, taken in connection with the drawings.

Changes within the scope of the appended claims may be made in the form and proportion of some of the parts while their essential features are retained and the spirit of the invention is embodied. Hence I do not desire to be limited to the precise form of all the parts as shown, reserving the right to vary therefrom.

I claim—

1. In a device of the character described, the combination of a carrier-plate provided with a keeper, a latch slidably fitted on the carrier-plate and engageable with said keeper, a lever fulcrumed on said carrier-plate, and a link pivoted to the latch and slidably connected to the lever, substantially as described.

2. In a device of the character described, the combination with a carrier-plate provided with a keeper and with flanges forming a guideway, a latch slidably fitted in the guideway and adapted to be engaged with said keeper, a lever fulcrumed on the carrier-plate and provided with an eccentrically-arranged stud or pin, and a slotted link pivoted to the latch and having slidable engagement with said stud or pin of the lever, substantially as described.

3. In a device of the character described, the combination of a carrier-plate, a retaining-keeper pivoted thereon and controlled by a spring which quickly throws said keeper to its open position, a latch slidably fitted on said carrier-plate, a cam-lever pivoted to said plate and having a safety-line attached thereto, a segment pivoted to said slidable latch and engaging with said cam-lever, and a trace-thimble arranged to be confined by and between the carrier-plate and the keeper, as and for the purposes described.

In witness whereof I have hereunto set my hand in the presence of two witnesses.

SAMUEL McINTYRE.

Witnesses:
CHARLES G. STRONG,
HUBERT CUNNINGHAM.